Patented Nov. 24, 1936

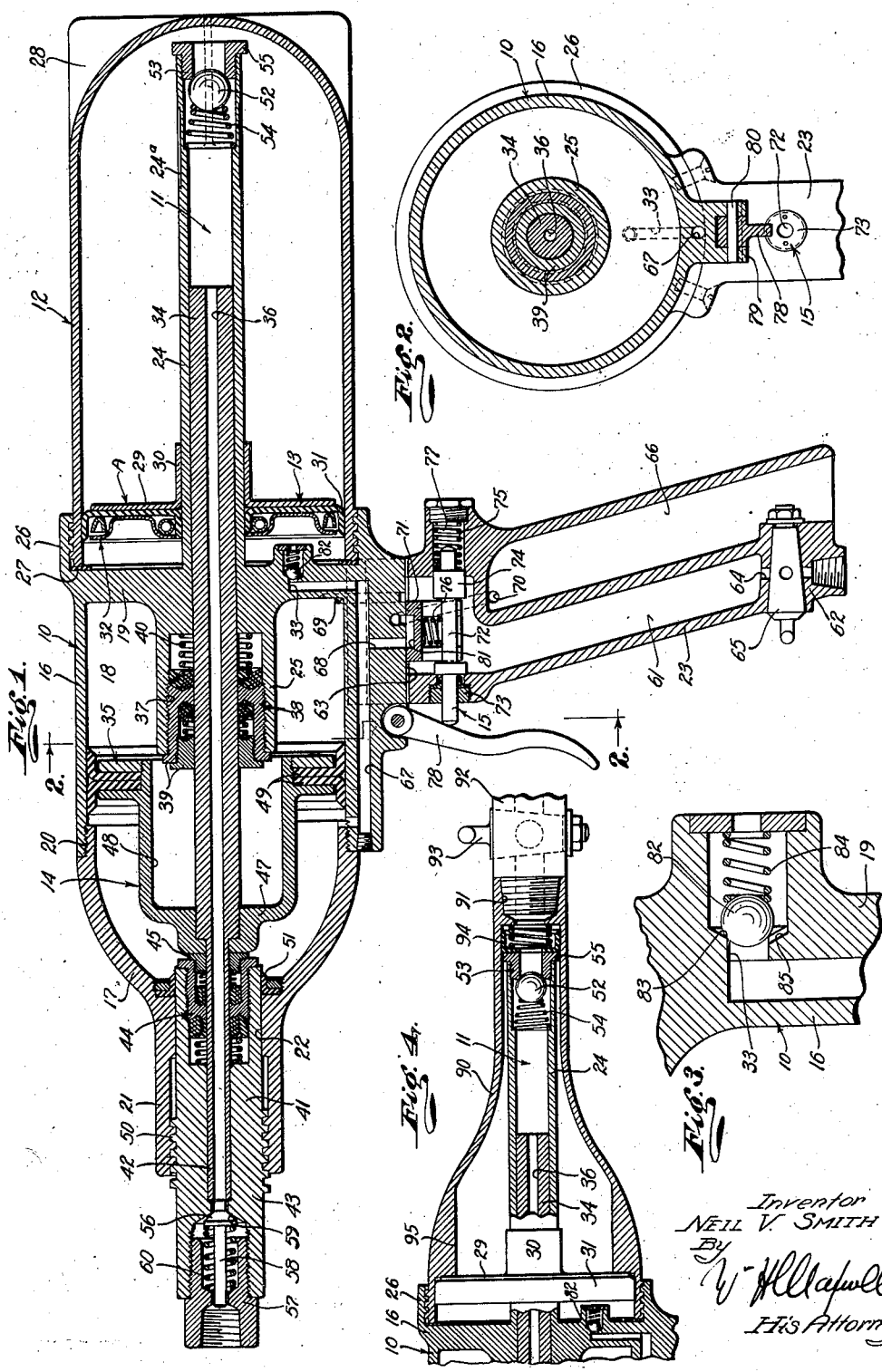

2,061,813

UNITED STATES PATENT OFFICE 2,061,813

GREASE GUN

Neil V. Smith, Los Angeles, Calif., assignor to Smith - Johnson Corporation, Los Angeles, Calif., a corporation of California Application November 20, 1934, Serial No. 753,864

18 Claims. (Cl. 221—47.3)

This invention relates to a lubricant handling or dispensing device and relates more particularly to a grease gun for forcing grease or other lubricant to machine parts. A general object of the invention is to provide a particularly effective pneumatic grease gun that is very compact and well balanced, and therefore easy and convenient to handle and operate.

Another object of the invention is to provide a lubricating device or grease gun that is capable of effectively handling and delivering practically all grades of greases as well as other lubricants. The mechanism of the grease gun of the present invention is capable of properly handling the various grades of what may be termed the more fluid greases and in addition thereto is capable of effectively handling the fibrous greases that cannot be used in or handled by the usual grease guns now in general use.

Another object of the invention is to provide a grease gun that embodies a readily replaceable grease container whereby it may be employed for dispensing various grades and classes of lubricants and upon removal of the container it may be quickly converted from a portable pneumatically operated mechanism carrying its own supply of lubricant to a booster type pneumatic gun for boosting or increasing the pressure on lubricant supplied to it from a central or remote source of lubricant under pressure.

Another object of the invention is to provide a grease gun of the character mentioned in which a minimum amount of lubricant must be removed or forced from its mechanism when it is desired to handle a different grade or class of lubricant.

Another object of the invention is to provide a lubricating device or grease gun in which the lubricant is fed from a lubricant reservoir or container to a high pressure cylinder by a means which slowly relieves the pressure on the lubricant in the container after actuation of the gun so that there is no tendency for the lubricant to slowly bleed from the gun when it is not in use and so that the lubricant container may be safely removed from the gun without cutting off the supply of actuating air under pressure of the gun. In the grease gun of the present invention the air under pressure is not applied to the lubricant in the lubricant container until the actuating pressure is applied to the ejector and thereafter the air under pressure is allowed to slowly leak from the lubricant container, this cycle of operation being repeated at each actuation of the gun so that pressure is intermittently supplied to the lubricant container as distinguished from certain prior devices wherein there is a constant admission of air under pressure to the lubricant container or reservoir.

Another object of the invention is to provide a lubricant device or grease gun wherein the valve governing the admission of lubricant from the lubricant container or reservoir to the high pressure cylinder is readily accessible for cleaning, adjustment, repair and replacement.

Another object of the invention is to provide a grease gun in which the stroke of the lubricant ejecting plunger may be readily varied whereby the gun may be made to discharge various quantities of lubricant as may be required for the lubrication of various machine parts or units.

Another object of the invention is to provide a grease gun of the character mentioned that does not include a suction tube for carrying lubricant from the lubricant container to the charge holder or high pressure cylinder, which tube is an element found in certain prior devices and which has numerous disadvantages. It has been found that high pressures are required to force the heavy grades of lubricants through the suction tube and the use of these high pressures in turn necessitates the use of a strong spring in the foot valve which is undesirable. The use of the suction tube makes the foot valve inaccessible for adjustment, etc., and requires that a substantial quantity of lubricant be cleaned from the gun when it is desired to use a different grade of lubricant.

One of the important objects of the invention is to provide a lubricant handling device or grease gun of the character mentioned in which the lubricant reservoir or container, the power cylinder, the high pressure lubricant cylinder, and the valves governing the admission and discharge of lubricant to and from the high pressure cylinder are co-axial or have a common longitudinal axis whereby the device is slightly, compact, well balanced, and has numerous features and advantages, certain of which have been set forth above and others of which will be made evident by the following detailed description.

Another important object of the invention is to provide a grease gun embodying a tubular lubricant ejector or plunger which allows for the longitudinal alining or coaxial arrangement of the lubricant container, the power chamber, the high pressure cylinder, and the valves and provides for the elimination of the lubricant tube and provides for other advantages and features.

Another object of the invention is to provide a grease gun of the character mentioned in which the actuating air under pressure is admitted and discharged through the end of the handle, thereby facilitating the easy operation and manipulation of the gun.

A further object of the invention is to provide a lubricating device or grease gun that is simple and inexpensive of manufacture and simple and convenient to operate.

Other objects and features of the invention may be fully understood from the following detailed description of typical preferred forms and applications of the invention throughout which description, references will be had to the accompanying drawing, in which:

Fig. 1 is a central longitudinal detailed sectional view of the device or gun of this invention illustrating the parts in the normal or unactuated positions. Fig. 2 is a transverse detailed sectional view taken as indicated by line 2—2 on Fig. 1. Fig. 3 is an enlarged vertical fragmentary detailed sectional view of the valve for controlling the discharge of air under pressure from the lubricant container and Fig. 4 is a reduced longitudinal detailed sectional view of the rear portion of the gun illustrating the means for converting the device into a booster type gun.

The lubricating device or grease gun of the invention includes generally a body 10 having a charge holder or high pressure lubricant chamber or cylinder 11, a lubricant reservoir or container 12 removably secured to the body 10, means 13 for forcing or feeding lubricant from the container 12 into the high pressure cylinder 11, means 14 for ejecting lubricant from the high pressure cylinder 11, and valve means 15 for controlling the admission of the actuating air under pressure to the feed means 13 and ejecting means 14.

The body 10 may be varied somewhat in shape and construction, it being preferred however to construct the body substantially as illustrated in the drawing whereby the assembly of the body 10 and the lubricant container 12 constitutes a symmetrical elongate unit that is sightly and well balanced. In the construction illustrated in the drawing the body 10 is sectional comprising an inner section 16 and an outer section 17. The inner section 16 is substantially cylindrical and is hollow or provided with a longitudinal chamber 18. The chamber 18 preferably has a cylindrically curved wall and is closed at its rear end by a partition 19. The outer or forward section 17 may be threadedly connected to the section 16, for example it may have a reduced portion threaded into the forward end of the section 16 as at 20. The section 17 has a forward portion 21 that is appreciably reduced in diameter and that may be cylindrical. The inner portion of the section 17 may gradually diminish in diameter from the point of its connection with the section 16 forwardly to the portion 21. The section 17 is tubular, having a longitudinal opening 22 whose inner portion constitutes an outwardly or forwardly diminishing extension of the chamber 18.

A handle 23 projects from the body 10 to facilitate the operation and manipulation of the device or gun. It is preferred to provide the handle 23 substantially mid-way between the opposite ends of the device or adjacent its center of gravity. As the lubricant container 12 is secured to the body section 16 to extend longitudinally therefrom, the handle 23 projects downwardly from the body section 16 adjacent its rear end. The handle 23 may slope or incline downwardly and rearwardly. The handle 23 is shaped to be readily grasped and held by the operator and carries the principal parts of the valve means 15. In accordance with the invention the charge holder or high pressure lubricant cylinder 11 is coaxial with the body 10; that is, the body and cylinder 11 have a common longitudinal axis. The chamber or cylinder 11 is provided to receive charges of lubricant from the container 12 which charges are ejected from the cylinder 10 through the forward end of the body 10. The high pressure lubricant cylinder 11 may be in the nature of a longitudinal opening in a central tubular stem or extension 24 projecting rearwardly from the partition 19. The cylinder 11 extends into the extension 24 from its outer end and continues forwardly through the partition 19 and a forwardly projecting boss 25 on the forward side of the partition. The cylinder 11 is preferably uniform in diameter and of substantial length.

The lubricant reservoir or container 12 is removably secured or attached to the body 10 so that it may be readily disconnected therefrom and replaced by another container holding lubricant of a different grade or type. It is a feature of the invention that the replaceable lubricant container 12 is co-axial with the body 10 and surrounds or encloses the extension 24 to directly supply lubricant to the high pressure chamber or cylinder 11. In accordance with the broader aspects of the invention the lubricant container 12 may be removably secured in the body 10 in any suitable or practical manner. In practice a rearwardly projecting annular member or flange 26 may be provided on the rear end of the body section 16 and the open end of the container 12 may be threaded into the flange 26 in the manner illustrated in Fig. 1 of the drawing. A suitable gasket 27 may be provided to seal between the container 12 and the rear end of the body section 16.

The outer or rear end of the container 12 is closed and provided with ribs or wings 28 for supporting the container in a vertical position when removed or disconnected from the body 10. The removable lubricant container 12 may be cylindrical in its general configuration and may have a spherically rounded rear or outer end. The container 12 is proportioned so that the outer end of the extension 24 is spaced a short distance from the outer or rear end wall of the container. It will be apparent how the container 12 may be supplied with the desired or required lubricant and threaded into the flange 26 to directly supply lubricant to the high pressure cylinder 11. As will be hereinafter described the container 12 may be replaced by a fitting for adapting the gun for handling lubricant from a remote source of lubricant under pressure.

The means 13 for forcing or feeding charges of lubricant to the high pressure lubricant cylinder 11 is fluid pressure actuated or pneumatically actuated and is under the control of the valve means 15. The means 13 includes a piston A slidable on the body part or extension 24 and operable in the container 12 to feed lubricant therefrom into the high pressure cylinder 11. The feeding piston A of the means 13 includes a body 29 having a tubular extension or sleeve 30 slidable longitudinally on the extension 24. A cup leather or sealing element 31 is arranged against the inner side of the piston body 29 and slidably seals with the interior of the container 12 and the external surface of the extension 24.

Suitable means 32 is provided for maintaining the sealing element 31 in proper sealing cooperation with the internal wall of the container 12 and the extension 24. The piston A of the means 13 is movable outwardly or rearwardly on the extension 24 to force grease from the container 12 into the high pressure cylinder 11 and is moved by or under the influence of air under pressure admitted into the forward end of the container 12 by a port 33 in the partition 19. The port 33 is valved and the supply of air under pressure to the port is controlled by the valve means 15. Slots or grooves 24a are provided in the rear end portion of the extension 24 for bypassing the actuating air pressure through the piston sleeve 30 and past the sealing element 31 upon the piston reaching the end of its active stroke.

The means 14 for ejecting charges of lubricant from the high pressure cylinder 11 is actuated by air under pressure supplied to it under the control of the valve means 15 and is operable to force charges of grease from the cylinder 11 to the machine parts to be lubricated. The means 14 is characterized by a tubular ejector or plunger 34 operable in the cylinder 11 by air under pressure acting on a piston 35 in the chamber 18. At this point it may be noted that high pressure lubricant cylinder 11, the plunger 34, the chamber 18, and the piston 35 operable in the chamber are all coaxial with the body 10. The ejector or plunger 34 is a simple elongate member having a longitudinal opening 36 extending through it from one end to the other. The opening 36 is preferably relatively small in diameter with respect to the plunger. The plunger 34 extends rearwardly into the high pressure cylinder 11 and fits the cylinder with suitable slight clearance. A socket 37 in the boss 25 carries a double packing assembly 38 for sealing about the plunger 34. The packing of the assembly 38 is held under compression by threaded followers 39 and springs 40. The charge ejecting plunger 34 extends forwardly into a member 41 arranged in the opening 22 of the body section 17. The forward end portion 42 of the plunger 34 is materially reduced in diameter and operates in a longitudinal opening 43 in the member 41. A double spring pressed packing assembly 44 is provided in an enlargement of the opening 43 to seal about the reduced portion 42 of the plunger and includes a projecting inner follower 45.

The actuating piston 35 in the chamber 18 includes a nave or body 47 connected with the plunger 34. This piston body 47 may be shrunk on to the plunger 34 and preferably has shouldered engagement with the plunger at the point where the reduced plunger portion 42 joins the major portion of the plunger. The piston body 47 projects rearwardly and is provided with a socket or recess 48 which is adapted to receive the boss 25 with suitable clearance. Oppositely facing cup leathers or sealing elements 49 are carried by the piston body 47 for slidably sealing with the wall of the chamber 18.

The plunger 34 is proportioned so that when it is in its forward or unactuated position the rear portion of the cylinder 11 is open for the reception of a charge of lubricant from the container 12. It is a feature of the invention that the stroke of the plunger 34 may be adjusted or varied at the will of the operator to adapt the device or gun to eject charges of lubricant required for the proper lubrication of any particular or specific machine unit. The member 41 is shiftable or adjustable longitudinally to regulate the stroke of the lubricant ejecting plunger 34. Cooperating screw threads 50 are provided on the member 41 and the wall of the opening 22 whereby the member may be threaded longitudinally in the opening. The member 41 has a forward projecting portion which may be flat-sided or otherwise shaped to be engaged for easy turning. The follower 45 on the inner end of the member 41 is engageable by the piston body 47 to limit the return movement of the plunger 34 and threading of the member 41 to various longitudinal positions regulates or varies the stroke of the plunger 34 whereby the device is capable of ejecting various amounts of lubricant at each actuation. A cup leather 51 may be provided for sealing about the inner end portion of the member 41.

Valves are provided for controlling the admission and discharge of lubricant from the high pressure lubricant chamber 11. A suction or inlet valve 52 is provided at or in the rear end portion of the cylinder 11. The valve 52 may be in the nature of a ball valve adapted to seal outwardly or rearwardly against a seat 53 to prevent the rearward discharge of lubricant from the cylinder 11 during the active or rearward stroke of the plunger 34. A spring 54 urges the valve 52 against the seat 53. The seat 53 is preferably removable to facilitate its adjustment and replacement as well as the adjustment and replacement of the valve 52 and spring 54. In the construction illustrated in the drawing the seat 53 is threaded into the end portion of the extension 24 and has a flange 55 bearing against the end of the extension. It will be noted that the valve seat 53 is conveniently accessible for removal when the lubricant container 12 is removed or disconnected from the body 10. The valve 52 remains closed during the active or rear stroke of the plunger 34 and is adapted to open upon the return of the plunger to admit lubricant into the cylinder 11 from the container 12.

An outlet or discharge valve 56 is provided for controlling the ejection of the lubricant from the gun. The valve 56 is preferably carried by or arranged in the adjustable member 41. A nipple or fitting 57 may be threaded into a socket in the forward end of the member 41 to facilitate the connection of an extension or hose (not shown) with the discharge of the gun. The fitting 57 may operate to guide the stem 58 of the valve 56. The valve 56 normally seats or seals inwardly against a forwardly facing seat 59 at the mouth of the opening 43. A spring 60 engages the valve 56 to urge it into cooperation with the seat 59. The outlet valve 56 prevents lubricant from bleeding from the gun when the connection with the lubricant receiving fitting is broken even though air under pressure may remain in the container 12.

The valve means 15 is adapted to be manually controlled to govern the passage of actuating air under pressure through a system of ports in the body 10 and handle 23 to provide for the actuation of the plunger 34 and the feeding of lubricant to the cylinder 11. In accordance with the invention air under pressure is supplied to the mechanism through the lower end of the handle 23 and is exhausted from the mechanism through the end of the handle. A longitudinal chamber 61 extends through the handle 23 and is closed at its lower end by a ported wall 62. A ported lower surface 63 of the body section 16 closes the upper end of the chamber 61. A port 64 in the wall 62 is provided to deliver the air under pressure to the chamber 61 and the wall is socketed or otherwise provided with means for facilitating the connection of a hose or conduit with the handle for the purpose of supplying the air pressure to the port 64. A valve 65 may be provided in the wall 62 to control the flow through the port 64. A portion of the handle 23 is chambered or provided with a comparatively large opening 66 which constitutes the air discharge of the device. The lower end of the discharge opening 66 is open to the atmosphere at the lower end of the handle 23.

The system of ports in the body 10 includes a longitudinal opening or port 67 in the wall of the body section 16. The port 67 joins the port 33 and has communication with the forward end of the chamber 18. In practice the port 67 is preferably provided in the lower wall of the section 16 which is suitably thickened. A lateral or vertical port 68 extends from the port 67 to the surface 63 and under certain phases of operation of the device the port is in communication with the chamber 61. A port 69 extends through the wall of the body section 16 from the rear end of the chamber 18 to the surface 63. The lower end of the port 69 is spaced rearwardly from the port 68. A discharge port 70 extends through the wall of the section 16 and the handle 23 from the surface 63 to the outlet opening 66. The discharge port 70 is spaced between the lower ends of the ports 68 and 69.

The valve means 15 preferably comprises a single valve 71 for controlling the ports 68, 69, and 70 at the surface 63. The valve 71 may be in the nature of a slide valve slidably cooperating with the surface 63. The valve 71 is located in the upper portion of the air receiving chamber 61 and is carried and operated by a rod 72. The rod 72 may be substantially horizontal and its forward portion may be slidable in a gland or guide 73 to project from the forward side of the handle 23. Longitudinally spaced collars 74 are provided on the rod 72 within the chamber 61. The rear collar 74 may be slidable in an opening 75 to guide and support the rear end portion of the rod 72. The spaced collars 74 engage the opposite ends or sides of the valve 71 whereby the valve is movable longitudinally with the rod 72. A spring 76 is arranged under compression between the rod 72 and a face of the valve 71 to urge the valve into sealing cooperation with the surface 63. A spring 77 reacts forwardly against the rear collar 74 to normally hold the rod 72 and the valve 71 in their normal positions.

A trigger 78 is provided to operate the rod 72 and valve 71. The upper portion of the trigger 78 is received between lugs 79 on the body section 16 and a pin 80 extends through openings in the lugs and trigger to pivotally support the trigger. The trigger 78 projects downwardly to cooperate with the forward end of the valve rod 72 and is readily engageable by a digit of the operator's hand grasping the handle 23. The upper side of the valve 71 has a recess or port 81 adapted to normally simultaneously cooperate with the port 68 and the discharge port 70. The spring 77 normally holds the valve 71 in the position where the port 81 connects the ports 68 and 70 and the port 69 is open to the air receiving chamber 61.

The invention provides a novel valve means for governing the port 33 which admits and discharges the air under pressure to and from the forward end of the container 12. A valve 82 is adapted to seat inwardly or forwardly against a seat 83 on the wall of the port 33. The valve 82 may be in the nature of a ball valve and may be urged into cooperation with the seat by a spring 84. The valve 82 is unseated when the actuating air under pressure is admitted to the port 68 and allows the air under pressure to enter the forward end of the container 12 to act on the piston of the means 13. The seat 83 is grooved or notched as at 85 whereby air under pressure in the forward end of the container 12 may slowly leak past the valve 82 when it is in its closed position. This leakage of air under pressure from the container 12 relieves the pressure on the lubricant in the container following the use of the gun so that there is no tendency for the lubricant to bleed from the gun when it is idle and there is no danger in removing or detaching the container 12 from the body 10.

Fig. 4 of the drawing illustrates one of the preferred manners of converting the lubricating device from a portable power grease gun having its own supply of lubricant to a booster type power gun supplied with lubricant under pressure from a remote source. The means illustrated for adapting the device for use as a booster gun includes a tubular elongate fitting 90 having a forward end portion adapted to be threaded into the flange 26 on the rear end of the body 10. Following the removal of a container 12 from the body 10 the fitting 90 may be threaded into the flange 26 to surround the piston A of the means 13 and the extension 24. The outer or rear portion of the fitting 90 is reduced in diameter and has a threaded socket 91 or other suitable means for facilitating its connection with a hose or conduit 92 carrying lubricant under pressure. A valve 93 may be provided in the conduit 92 adjacent the rear end of the fitting 90. A spring held cup leather 94 may be provided to seal between the end of the valve seat 53 and the interior of the fitting 90. Means may be provided for holding the piston of the means 13 against actuation during the operation of the gun. Lugs 95 may be provided on the interior of the fitting 90 for engaging the piston body 29. The conduit 92 is adapted to conduct lubricant under a suitable pressure into the rear end of the fitting 90 so that it may be received in the high pressure cylinder 11 upon the return stroke of the plunger 34.

It is believed that the utility and operation of the lubricating device of the invention will be readily understood from the foregoing description. A conduit or flexible hose (not shown) carrying air under pressure from a suitable remote source may be connected with the handle 23 to pass the air under pressure into the chamber 61. A container 12 carrying the desired grade of lubricant may be threaded into the flange 26 to project from the rear of the body 10. The parts of the mechanism are normally in the positions illustrated in Fig. 1 of the drawing. With the parts in these positions and assuming that the valve 65 is open, air under pressure is admitted into the rear end of the chamber 18 through the port 69. The forward end of the chamber 18 and the air space in the container 12 are normally in communication with the atmosphere. After the fitting 57 has been connected with the fitting of the part to be lubricated through the medium of an extension or hose, the trigger 78 may be depressed or pivoted by a finger of the operator's hand grasping the handle 23.

Rearward pivoting or depression of the trigger 78 moves the valve 71 to a position where the port 68 is in communication with the air chamber 61 and the valve port 81 connects the port 69 with the air discharge port 70. This simultaneously admits air under pressure to the forward end of the chamber 18 and the forward end of the container 12 and exhausts the air under pressure from the rear end of the chamber 18. The air under pressure in the forward end of the chamber 18 acts on the piston 35 to force the plunger 34 rearwardly through the chamber 11. Assuming that there is a charge of lubricant in the cylinder 11 the rearward movement of the plunger 34 ejects this lubricant forwardly through the opening 36 and the fitting 57 to the extension or hose connected with the machine part to be lubricated. The outlet valve 56 is unseated or opened upon the lubricant in the chamber 11 and opening 36 being put under increased pressure by the rearward movement of the plunger 34. The valve 52 is of course tightly held in its closed position during the ejection of the charge of lubricant from the high pressure cylinder 11. It is to be understood that the operator may have adjusted the member 41 to any desired longitudinal position prior to the actuation of the plunger 34 to provide for the delivery of any required charge of lubricant.

As described in the preceding paragraph, movement of the valve 71 to its rear position simultaneously admits air under pressure to the forward end of the chamber 18 and the forward end portion of the lubricant container 12. During the active or lubricant ejecting stroke of the plunger 34 the pressure exerted on the lubricant in the container 12 by the piston A of the means 13 is insufficient to unseat or open the valve 52 and the air under pressure acting on the said piston merely holds the lubricant under pressure without forcing it into the cylinder 11. Upon the operator releasing the trigger 78, the spring 77 automatically returns the valve 71 to its normal position where the port 68 is connected with the air discharge port 70 by the valve port 81 and the port 69 is put into communication with the air supply chamber 61. This allows the air under pressure in the forward end of the chamber 18 to exhaust to the atmosphere simultaneously with the forward movement of the piston 35 under the influence of air under pressure admitted to rear portion of the chamber 18 by the port 69. In this manner the plunger 34 is automatically returned to its normal forward position.

Upon the return of the plunger 34 the air under pressure trapped in the forward end of the lubricant container 12 acts on the piston A of the means 13 to force or feed a charge of lubricant from the container into the high pressure lubricant cylinder 11. The high pressure cylinder 11 is thus supplied with a charge of lubricant upon the return of the ejecting plunger 34 to its normal position. The groove or grooves 85 in the valve seat 83 allow the air under pressure in the forward end of the lubricant container 12 to slowly leak out through the port 33 and the port 67 so that the pressure on the lubricant in the container is relieved following the employment or use of the gun. Thus when the device or gun is idle or not in use there is no tendency for lubricant to be forced past the valve 56 by pressure building up against the lubricant in the container 12. Further, as there is no air pressure retained in the container 12 the container may be safely detached from the device when it is not in operation.

The alining of the container 12, the high pressure lubricant cylinder 11, the tubular ejector 34, the chamber 18, and the piston 35 produces a lubricating device or grease gun that is particularly compact and well balanced. The device being well balanced and compact is easy to handle and manipulate. Further the supplying and discharging of the actuating air pressure through the lower end of the handle 23 greatly simplifies the handling of the device. The grease container 12 is secured to the body 10 to project from its rear end so that the container, together with its contents, operate to counter-balance the forward portion of the mechanism. Further, with the container in this position the cylinder 11 is directly supplied with lubricant from the container without the necessity of providing a duct or tube for this purpose. The gun is adapted to handle the heavy grades of lubricants that cannot be handled in the prior devices embodying suction tubes for supplying lubricant to the high pressure cylinders. The elimination of the suction tube is therefore a desirable feature. The elimination of the tube for supplying the charges of grease to the high pressure lubricant cylinder and the material reduction of clearances in the high pressure cylinder greatly reduce the quantity of lubricant that must be discharged or cleaned from the mechanism when it is desired to handle or dispense different grades of lubricant. The valve 71 has only two positions, namely, the normal or closed position and the open or active position where the plunger 34 is being actuated or is actuated.

Having described only typical preferred forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. A lubricant gun including, a body, a lubricant discharge part on one end of the body having an opening, a part on the other end of the body having a cylinder opening of greater diameter than the first mentioned opening, means for supplying charges of lubricant to the cylinder opening, a reciprocable tubular plunger comprising a portion operable in said first mentioned opening and a portion of greater diameter operable in the cylinder opening, the plunger operating to eject lubricant from the cylinder opening and conduct it to the discharge, and means external of the cylinder opening operating the plunger.

2. A lubricant gun including, cylinder and plunger lubricant ejecting means, a removable lubricant container associated with said means and having communication with the cylinder thereof, a piston operable in the container to force charges of lubricant to the said cylinder, means for actuating the plunger of said means, means for supplying air under pressure to the last means to reciprocate the plunger and for intermittently supplying air under pressure to the container to actuate said piston, and an automatic valve means for relatively slowly relieving pressure in the container having a bleeder opening of relatively small fixed size for such relief of pressure.

3. A lubricating gun including a body having a lubricant discharge at its forward end, a lubricant container removably secured to the body to project from its rear end, a part on the body having an opening in substantially longitudinal alignment with the discharge and container for receiving lubricant from the container, a piston movable in the container to force lubricant into the opening, a plunger operable in the opening for ejecting lubricant through the discharge means for supplying air under pressure to the container to actuate the piston, and a laterally projecting handle adjacent the center of gravity of the assembly of the body, container, and their associated parts whereby the gun is operatable by one hand.

4. A lubricant gun including, a body having a chamber and a lubricant cylinder, a lubricant reservoir, fluid pressure actuated means for feeding lubricant from the reservoir to the cylinder, a plunger for forcing lubricant from the cylinder, fluid pressure actuated means in the chamber for operating the plunger, means for intermittently supplying actuating fluid pressure to the first mentioned means whereby lubricant is fed to the cylinder during the return stroke of the plunger, and an automatic means for relieving the pressure on said first mentioned means at a relatively slow rate variable in accordance with the pressure in the reservoir.

5. A lubricant gun including a body having a chamber and a lubricant cylinder, a lubricant reservoir, fluid pressure actuated means for feeding lubricant from the reservoir to the cylinder, a plunger for forcing lubricant from the cylinder, a piston in the chamber for actuating the plunger, means for alternately supplying fluid pressure to the opposite ends of the chamber to reciprocate the piston and for delivering actuating fluid pressure to the feed means during the lubricant ejecting stroke of the plunger, and means for relieving fluid pressure from the feed means subsequent to the lubricant ejecting stroke of the plunger.

6. A lubricant gun including a body having a chamber and a lubricant cylinder, a lubricant reservoir, fluid pressure actuated means for feeding lubricant from the reservoir to the cylinder, a plunger for forcing lubricant from the cylinder, a piston in the chamber for actuating the plunger, means for alternately supplying fluid pressure to the opposite ends of the chamber to reciprocate the piston and for delivering actuating fluid pressure to the feed means during the lubricant ejecting stroke of the plunger, and a leak valve for relieving the fluid pressure on the feed means following the delivery of fluid pressure to the feed means.

7. In a grease gun, a cylinder, means for supplying lubricant to the cylinder, a plunger operable in the cylinder to eject a charge of lubricant therefrom, means for actuating the plunger, and means for varying the stroke of the plunger comprising an adjustable relatively stationary barrel receiving the plunger and engageable by the plunger to limit its movement.

8. In a grease gun, body having a cylinder, means for supplying lubricant to the cylinder, a plunger operable in the cylinder to eject a charge of lubricant therefrom, means for actuating the plunger, a member engageable by the plunger to limit its movement, the member having a port discharging the lubricant ejected by the plunger, and means connecting the member with the body for adjustment whereby the stroke of the plunger may be varied.

9. In a grease gun, an elongate body, lubricant ejecting means in the body, fluid pressure actuated means for feeding lubricant to the ejecting means, fluid pressure actuated means in the body for operating the ejecting means, and a laterally projecting handle on the body having fluid pressure inlet and outlet ports in its outer end.

10. In a grease gun, an elongate body, lubricant ejecting means in the body, fluid pressure actuated means for feeding lubricant to the ejecting means, fluid pressure actuated means in the body for operating the ejecting means, and a laterally projecting handle on the body having a chamber for holding fluid under pressure for the actuation of said means, a port in its end for admitting fluid pressure to the chamber and a fluid pressure exhaust in its end.

11. In a lubricant gun, a body having a lubricant discharge, a lubricant container removably secured to the body, two parts related for relative longitudinal movement, one a cylinder, the other a tubular plunger for ejecting lubricant from the cylinder, fluid pressure actuated means for reciprocating one of said parts, a piston for feeding lubricant from the container into the cylinder, and means for supplying air under pressure to said means and for intermittently applying air under pressure to the piston for its actuation.

12. In a lubricant gun, a body having a cylinder for holding a charge of lubricant, a plunger for ejecting the charge from the cylinder, and a threaded member on the body engageable by the plunger to limit its stroke, the member having a port conducting the charge ejected by the plunger and a part accessible for the application of a turning force whereby the stroke of the plunger may be varied.

13. A lubricant gun including a body having a chamber and a cylinder, a reservoir for holding lubricant, a piston movable in the reservoir for feeding lubricant to the cylinder, an ejector in the cylinder, a piston in the chamber for operating the ejector, a valve for controlling the delivery of pressure to the opposite ends of the chamber and to an end of the reservoir operable to simultaneously supply fluid pressure to an end of the chamber and an end of the reservoir to actuate the ejector to eject a charge of lubricant from the cylinder and put the lubricant in the reservoir under pressure, and an automatic leak valve for slowly relieving the pressure on the lubricant following the return of the ejector.

14. In a lubricant gun, a body having a cylinder and a barrel of less internal diameter than the cylinder, valved means for supplying a charge of lubricant to the cylinder, a tubular plunger having a portion operable in the cylinder and a portion of less diameter operable in the barrel, a valved outlet for the barrel, and means for operating the plunger whereby its first mentioned portion displaces the charge of lubricant from the cylinder to discharge from the barrel.

15. In a lubricant gun, a body having a cylinder and a barrel of less internal diameter than the cylinder, the barrel having a lubricant discharge, means for supplying a charge of lubricant to the cylinder, an inlet valve for the cylinder, a tubular plunger having a portion operable in the cylinder and a portion of less diameter operable in the barrel, and means for operating the plunger whereby its first mentioned portion displaces the charge of lubricant from the cylinder through the plunger and said discharge.

16. A lubricant gun comprising, a body having a cylinder, a barrel of less diameter than the cylinder and a chamber between the cylinder and barrel, said barrel having a valved lubricant outlet, a tubular plunger having a portion operable in the cylinder and a second portion of less diameter than the first mentioned portion operable in the barrel, an inlet valve for the barrel, means for supplying a charge of lubricant to the cylinder, and means for operating the plunger to displace the charge of lubricant from the cylinder through the plunger and outlet, the last mentioned means comprising a piston on the plunger operable in the chamber.

17. A lubricant gun comprising, a body having a cylinder, a barrel of less diameter than the cylinder and a chamber between the cylinder and barrel, said barrel having a valved lubricant outlet, a tubular plunger having a portion of less diameter than the first mentioned portion operable in the barrel, a valved inlet for the cylinder, means for supplying a charge of lubricant to the cylinder, and means for operating the plunger to displace the charge of lubricant from the cylinder through the plunger and outlet, the last mentioned means comprising a piston on the plunger operable in the chamber.

18. In a lubricant gun, a body having a cylinder and a chamber, means supplying lubricant to the cylinder, a plunger operable to force the lubricant from the cylinder, means on the body sealing about the plunger and forming a projection in the chamber, and means for operating the plunger comprising a piston on the plunger operable in the chamber and having a socket receiving said projection.

NEIL V. SMITH.